(12) United States Patent
Yang

(10) Patent No.: US 10,003,974 B2
(45) Date of Patent: Jun. 19, 2018

(54) ELECTRONIC SUBSCRIBER IDENTITY MODULE MANAGEMENT UNDER MULTIPLE CERTIFICATE AUTHORITIES

(71) Applicant: Apple Inc., Cupertino, CA (US)

(72) Inventor: Xiangying Yang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 15/153,672

(22) Filed: May 12, 2016

(65) Prior Publication Data

US 2016/0373932 A1 Dec. 22, 2016

Related U.S. Application Data

(60) Provisional application No. 62/182,283, filed on Jun. 19, 2015.

(51) Int. Cl.
| | |
|---|---|
| H04M 1/66 | (2006.01) |
| H04W 12/08 | (2009.01) |
| H04W 8/26 | (2009.01) |
| H04W 60/00 | (2009.01) |
| H04W 4/00 | (2018.01) |
| H04W 12/04 | (2009.01) |

(52) U.S. Cl.
CPC ............ *H04W 12/08* (2013.01); *H04W 4/00* (2013.01); *H04W 8/26* (2013.01); *H04W 12/04* (2013.01); *H04W 60/00* (2013.01)

(58) Field of Classification Search
CPC ..... H04W 12/06; H04W 8/183; H04W 88/06; H04W 12/08; H04W 4/24; H04W 76/021; H04W 84/12; H04W 88/04; H04L 63/08; H04L 67/306; H04L 63/102; H04L 63/0823; H04L 63/0861; H04L 2463/102; H04L 63/04

USPC .. 455/418, 432.1, 552.1, 414.1, 41.1, 435.1, 455/406, 412.1, 419, 426.1
See application file for complete search history.

(56) References Cited

U.S. PATENT DOCUMENTS

| | | |
|---|---|---|
| 2012/0117635 A1 | 5/2012 | Schell et al. |
| 2013/0227646 A1 | 8/2013 | Haggerty et al. |
| | (Continued) | |

OTHER PUBLICATIONS

International Patent Application No. PCT/US2016/033115—International Search Report and Written Opinion dated Aug. 19, 2016.

*Primary Examiner* — Fred Casca
(74) *Attorney, Agent, or Firm* — Dickinson Wright RLLP

(57) ABSTRACT

Representative embodiments set forth techniques for enabling a mobile device to be a member of various trust circles. According to some embodiments, an embedded Universal Integrated Circuit Card (eUICC) included in the mobile device can be configured to store, for each trust circle of which the eUICC is a member, at least one digital certificate associated with a Certificate Authority (CA) that serves as a root of the trust circle. In this manner, the at least one digital certificate for each trust circle enables the eUICC to participate as a member of the trust circle. According to some embodiments, the eUICC can be pre-configured to include digital certificates that establish membership to trust circles that the mobile device may encounter during operation. Moreover, the eUICC can also be updated to modify the different trust circles, which can further enable the functionality of the mobile device to evolve throughout its operation.

20 Claims, 7 Drawing Sheets

(56) References Cited

U.S. PATENT DOCUMENTS

| | | | |
|---|---|---|---|
| 2014/0134981 A1* | 5/2014 | Park | H04W 12/06 455/411 |
| 2014/0235210 A1 | 8/2014 | Park et al. | |
| 2014/0267339 A1* | 9/2014 | Dowd | H04L 63/0428 345/581 |
| 2014/0329502 A1* | 11/2014 | Lee | H04W 12/06 455/411 |
| 2015/0358411 A1* | 12/2015 | Kruglick | G06F 21/62 709/228 |

* cited by examiner

ELECTRONIC SUBSCRIBER IDENTITY MODULE MANAGEMENT UNDER MULTIPLE CERTIFICATE AUTHORITIES

CROSS-REFERENCE TO RELATED APPLICATION

This application claims the benefit of U.S. Provisional Patent Application No. 62/182,283, entitled "Electronic Subscriber Identity Module Management Under Multiple Certificate Authorities," filed Jun. 19, 2015, the contents of which are incorporated by reference herein in their entirety for all purposes.

FIELD

The described embodiments set forth a technique for increasing the overall operating flexibility of a mobile device by enabling the mobile device to be a member of various trust circles (e.g., enforced by Mobile Network Operators (MNOs), regions, etc.).

BACKGROUND

Many mobile devices are configured to utilize Universal Integrated Circuit Cards (UICCs) that enable the mobile devices to access services provided by Mobile Network Operators (MNOs). In particular, each UICC includes at least a microprocessor and a read-only memory (ROM), where the ROM is configured to store an MNO profile that a mobile device can utilize to register and interact with an MNO. Typically, a UICC takes the form of a small removable card (commonly referred to as a Subscriber Identity Module (SIM) card) that is configured to be inserted into a UICC-receiving bay included in a mobile device. In more recent implementations, however, UICCs are being embedded directly into system boards of mobile devices. These embedded UICCs (eUICCs) can provide advantages over traditional SIM cards, e.g., an eUICC can store a number of MNO profiles—also referred to herein as "electronic Subscriber Identity Modules (eSIMs)"—and can eliminate the need to include UICC-receiving bays in mobile devices. Moreover, eSIMs can be remotely provisioned to mobile devices, which can substantially increase the overall flexibility when users purchase mobile devices, migrate their phone numbers to different MNOs, and the like.

Despite the various advantages provided by eUICCs and eSIMs, certain operating flexibility limitations have yet to be addressed. One limitation, for example, is that conventional approaches dictate that a given mobile device should be a member of only one trust circle, e.g., a trust circle associated with an MNO with which the mobile device is configured to interface. According to some approaches, an eUICC of a mobile device can be a member of the trust circle by storing one or more digital certificates associated with a Certificate Authority (CA) that serves as a root of the trust circle. Notably, as different MNOs/regions are associated with a wide variety of trust circles that are substantially distinct from one another, restriction of the eUICC of the mobile device to a single trust circle membership can be problematic with respect to the overall operating flexibility of the eUICC. For example, when a user seeks to install a new eSIM onto the eUICC—e.g., an eSIM for an MNO in a foreign country—and the eSIM/MNO are associated with a trust circle of which the eUICC is not a member, the user is unable to utilize the functionality that the eSIM could otherwise provide. Consequently, the overall operating flexibility of the mobile device remains limited, which can degrade the user's overall satisfaction.

SUMMARY

Some embodiments set forth a method for enabling a mobile device to operate as a member of a plurality of trust circles. Specifically, the method is implemented at an embedded Universal Integrated Circuit Card (eUICC) included in the mobile device, and includes the operations of (1) receiving a request to perform a management operation an electronic Subscriber Identity Module (eSIM)—such as an installation of the eSIM, an uninstallation of the eSIM, an activation of the eSIM, a deactivation of the eSIM, a swap of the eSIM with another eSIM, and the like. In response to the request received at operation (1), the eUICC carries out operations that include 2) identifying a particular trust circle that corresponds to the eSIM, (3) determining whether the particular trust circle is included in the plurality of trust circles, and (4) when the particular trust circle is included in the plurality of trust circles: (i) permitting access to the particular trust circle, and (ii) performing the management operation on the eSIM in accordance with the particular trust circle. According to some embodiments, and to conform with wireless communication protocols that limit the mobile device to use only a single trust circle at one time, the method can further include the eUICC preventing access to other trust circles that are different from the particular trust circle, thereby ensuring that only a single trust circle is active at any time within the mobile device.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
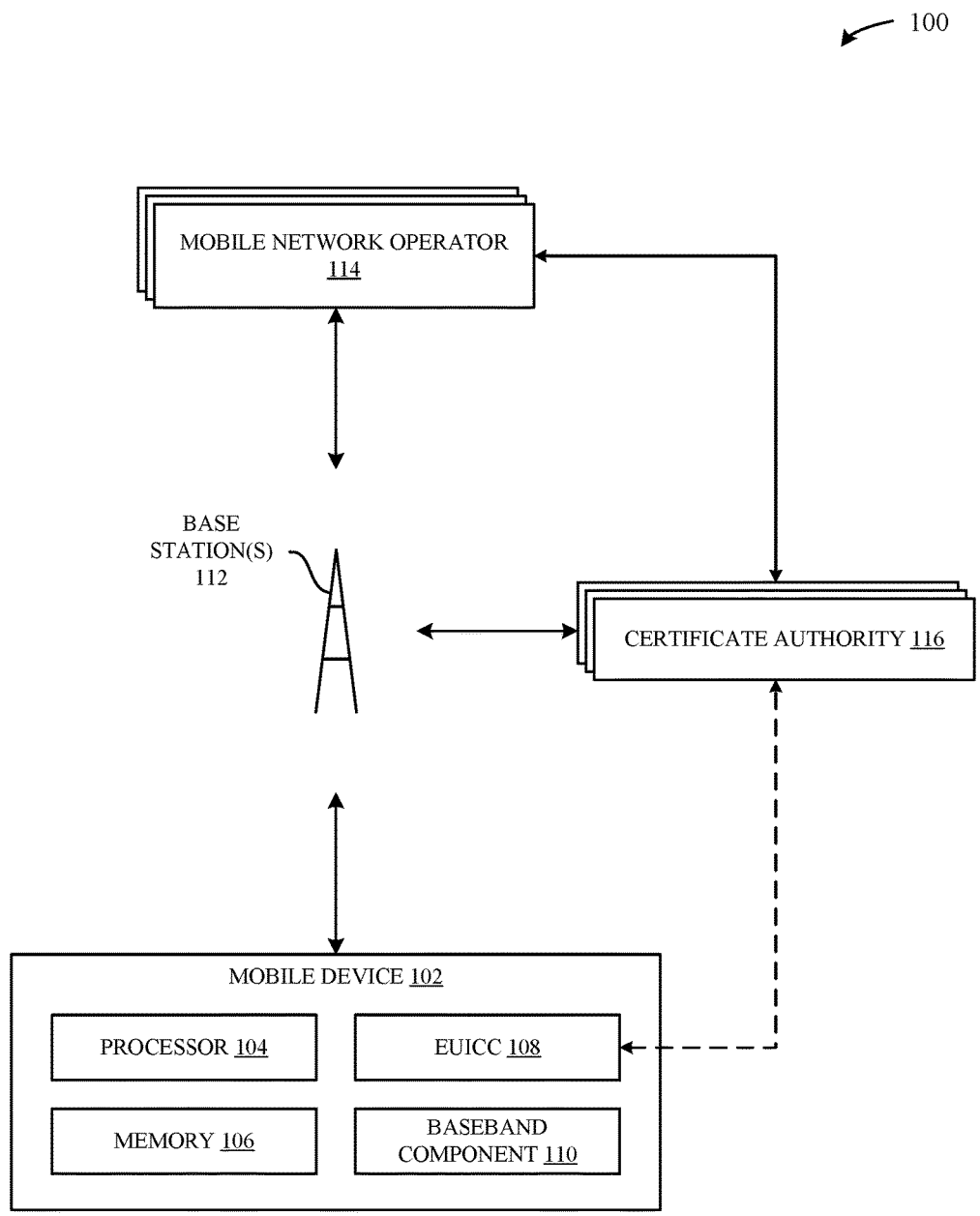
FIG. 1 illustrates a block diagram of different components of a system configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Representative embodiments described herein set forth techniques for enabling a mobile device to be a member of various trust circles in order to increase the overall operating flexibility of the mobile device. According to some embodiments, an embedded Universal Integrated Circuit Card (eUICC) included in the mobile device can be configured to store, for each trust circle of which the eUICC is a member, at least one digital certificate associated with a Certificate Authority (CA) that serves as a root of the trust circle. In this manner, the at least one digital certificate for each trust circle enables the eUICC to participate as a member of the trust circle, which, as described in greater detail herein, can significantly expand the overall operating flexibility of the mobile device. According to some embodiments, the eUICC can be pre-configured (e.g., at a time of manufacture) to include digital certificates that establish membership to trust circles that the mobile device may encounter during operation (e.g., when traveling to foreign countries, switching between MNOs, etc.). According to some embodiments, the eUICC can also be updated (e.g., via an over the air (OTA) update) to modify (e.g., add, update, remove) the different trust circles of which the eUICC is member, which can further enable the functionality of the mobile device to evolve throughout its operation.

In some cases, it can be necessary for the eUICC to conform to different, standardized operating practices, which can present challenges with respect to providing the expanded functionality described herein. For example, the long-term and widespread usage of physical SIM cards has established a common operating practice where it is expected that each mobile device is a member of only a single trust circle. Notably, although increases are being seen in the usage of eUICCs and eSIMs, physical SIM card usage remains prevalent and intact. As a result, various entities—such as MNOs, regions, and the like—continue to expect the single trust circle membership operating practice to remain intact even when eUICCs and eSIMs are implemented. Accordingly, to provide the enhanced functionality described herein—while satisfying single trust circle membership operating practice—the embodiments set forth a variety of approaches that can be used to control the utilization of the various trust circles of which the eUICC is member. More specifically, the embodiments set forth techniques for enabling an eUICC to be compatible with multiple trust circles while ensuring that only a single trust circle is active at a time. In this manner, the operating flexibility of the eUICC can be substantially expanded without violating the single trust circle membership operating practice. These approaches are described below in greater detail in conjunction with FIGS. 1, 2A-2B, 3A-3B, and 4-5.

FIG. 1 illustrates a block diagram of different components of a system 100 that is configured to implement the various techniques described herein, according to some embodiments. More specifically, FIG. 1 illustrates a high-level overview of the system 100, which, as shown, includes a mobile device 102, one or more base stations 112, one or more MNOs 114, and one or more Certificate Authorities (CAs) 116. According to some embodiments, the mobile device 102 represents a wireless communication device (e.g., a smart phone, a tablet, a laptop, etc.) that is capable of communicating with at least one of the MNOs 114 via at least one of the base stations 112. According to some embodiments, one or more of the MNOs 114 are configured to be associated with one or more of the CAs 116. For example, an MNO 114 can be configured to utilize services provided by a CA 116, e.g., digital certificate management for establishing a trust circle. As shown in FIG. 1, the mobile device 102 can include a processor 104, a memory 106, an eUICC 108, and a baseband component 110. The eUICC 108 can represent, for example, a hardware component that is embedded within a system board of the mobile device 102 and is configured to provide a more flexible environment than traditional, removable UICCs (e.g., SIM cards). As described in greater detail below, the eUICC 108 can be configured to manage digital certificates associated with the certificate authorities 116 in a manner that enables the eUICC 108 to be a member of a multiple trust circles. The eUICC 108 can also be configured to manage its own eUICC certificates 236 that enable the eUICC 108 to establish secure connections with external entities (e.g., MNOs 114, managers of the mobile device 102/the eUICC 108, etc.), which is described below in great detail in conjunction with FIG. 4.

Figure 2A:
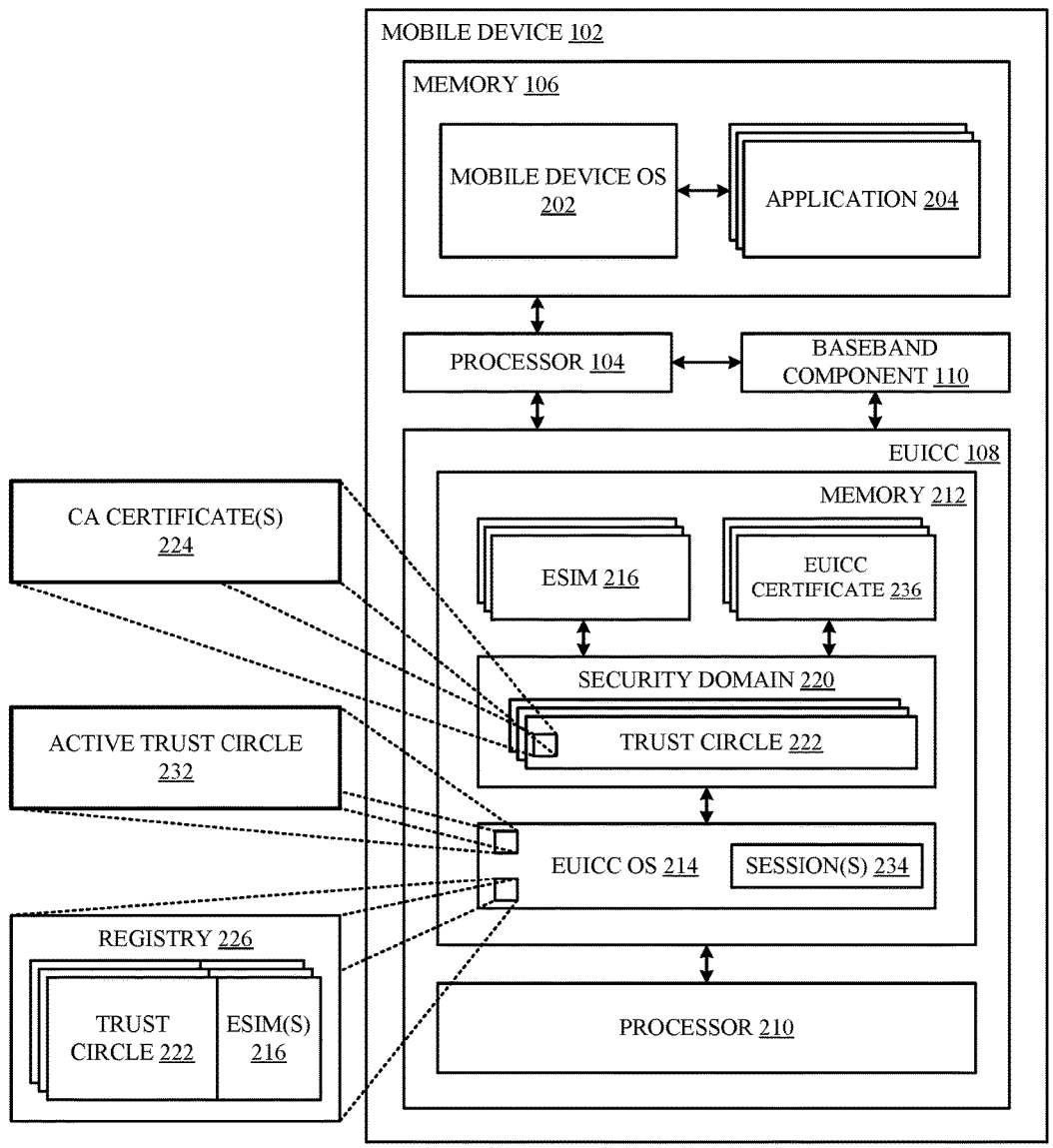
FIG. 2A illustrates a more detailed view of the mobile device of FIG. 1, and further illustrates a registry-based approach for implementing the various techniques described herein, according to some embodiments.

FIG. 2A illustrates a more detailed view 200 of the mobile device 102 of FIG. 1, and further illustrates a registry-based approach for implementing the various techniques described herein, according to some embodiments. As shown in FIG. 2A, a mobile device OS 202 and one or more applications 204 can execute on the mobile device 102 by way of the processor 104 and the memory 106. FIG. 2A also illustrates various hardware/software components that can be included in the eUICC 108. More specifically, the eUICC 108 can include a processor 210 and a memory 212 that collectively enable an eUICC OS 214 to execute within the eUICC 108 and manage one or more eSIMs 216. According to this configuration, the processor 104, the processor 210, and the baseband component 110 can work in conjunction to enable the mobile device 102 to access services provided by at least one of the MNOs 114 illustrated in FIG. 1.

As noted above, FIG. 2A illustrates a registry-based approach for implementing the various techniques described herein, according to some embodiments. More specifically, to implement the registry-based approach, the eUICC 108 can be configured to implement a security domain 220 that includes multiple trust circles 222. Notably, the security domain 220 contrasts conventional security domains (e.g., those implemented by physical SIM cards), as a conventional security domain would include only a single trust circle 222. According to some embodiments, and as illustrated in FIG. 2A, a trust circle 222 can include one or more CA digital certificates 224, which represent digital certificates that are associated with the CAs 116 illustrated in FIG. 1.

As previously described herein, the eUICC 108 can be configured to be a member of multiple trust circles 222, yet operate such that only a single trust circle 222 is activated within the eUICC 108 at a time. To provide this functionality, the eUICC OS 214 can be configured to implement a registry 226, which, as shown in FIG. 2A, includes entries that establish relationships between eSIMs 216 and trust circles 222. A relationship between an eSIM 216 and a trust circle 222 can be established, for example, when the eSIM 216 is installed onto the eUICC 108, where, during the installation, it is identified that the trust circle 222 is associated with the eSIM 216. In conjunction with the installation, an entry can be added to the registry 226 that establishes a relationship between the eSIM 216 and the trust circle 222. In another example, the eSIM 216 can include a property that indicates an associated trust circle 222. In this manner, each time an eSIM 216 is activated—and a corresponding trust circle 222 needs to be identified—the eUICC OS 214 can identify the corresponding trust circle 222 via the property and activate the corresponding trust circle 222.

According to some embodiments, the eUICC OS 214 can be configured to maintain an active trust circle 232 that dynamically represents a particular one of the trust circles 222 that is activated within the eUICC 108. According to some embodiments, the eUICC OS 214 can be configured to switch between (i.e., activate different) trust circles 222 in accordance with operating requests that the eUICC 108 is tasked with carrying out. For example, when the eUICC OS 214 receives a request to perform a management operation on a particular eSIM 216 (e.g., from an MNO 114 associated with the eSIM 216), the eUICC OS 214 can be configured to reference the registry 226 to identify a trust circle 222 to which the eSIM 216 corresponds. Next, the eUICC OS 214 deactivates the active trust circle 232 (assuming the active trust circle 232 does not represent the identified trust circle 222), which can involve preventing access to the CA certificates 224 associated with the active trust circle 232. Subsequently, the eUICC OS 214 can activate the identified trust circle 222, which can involve enabling access to the CA certificates 224 associated with the identified trust circle 222. It is noted that the deactivation/activation steps can be performed in any order. In turn, when the identified trust circle 222 is activated, the active trust circle 232 represents the identified trust circle 222, whereupon the management operation can be performed on the particular eSIM 216.

Additionally, it is noted that different approaches can be used with respect to the level at which activating a trust circle 222—that is, enabling access to the CA certificates 224 associated with the trust circle 222, and preventing access to the CA certificates 224 associated with the remaining trust circles 222—is carried out within the eUICC 108. According to some embodiments, to provide fine-granularity trust circle 222 activation within the eUICC 108, the eUICC OS 214 can be configured to implement a session 234 for each management operation request that is received, where the scope of each session 234 is limited to a particular trust circle 222. For example, when a session 234 is generated by the eUICC OS 214 (e.g., in response to a management operation request), the eUICC OS 214 can be configured to identify a corresponding trust circle 222 and configure the scope of the session 234 to have visibility to the CA certificates 224 that are associated with the corresponding trust circle 222. This can involve, for example, establishing sandboxed containers for each of the trust circles 222, and permitting each session 234 to have read access to a particular one of the sandboxed containers. In this manner, each session 234 can correspond to a single trust circle 222, thereby maintaining the single trust circle membership operating practice intact. Alternatively, to provide coarse-granularity trust circle 222 activation within the eUICC 108, the eUICC OS 214 can be configured to perform global-level transitions when activating a trust circle 222. This can involve, for example, the eUICC OS 214 being configured to provide visibility only to a single trust circle 222 within the eUICC 108 at a given time, where more substantial operations (e.g., eUICC 108 management commands) are carried out when transitioning between trust circles 222 in comparison to the sandboxed approached set forth above. According to this alternative approach, the single trust circle membership operating practice can also remain intact.

It is noted that the separations/responsibilities of the various components of FIG. 2A are not limited to the illustrations of FIG. 2A or the exemplary embodiments described herein, and that these components can be combined/modified to provide the same functionality without departing from the scope of this disclosure.

Figure 2B:
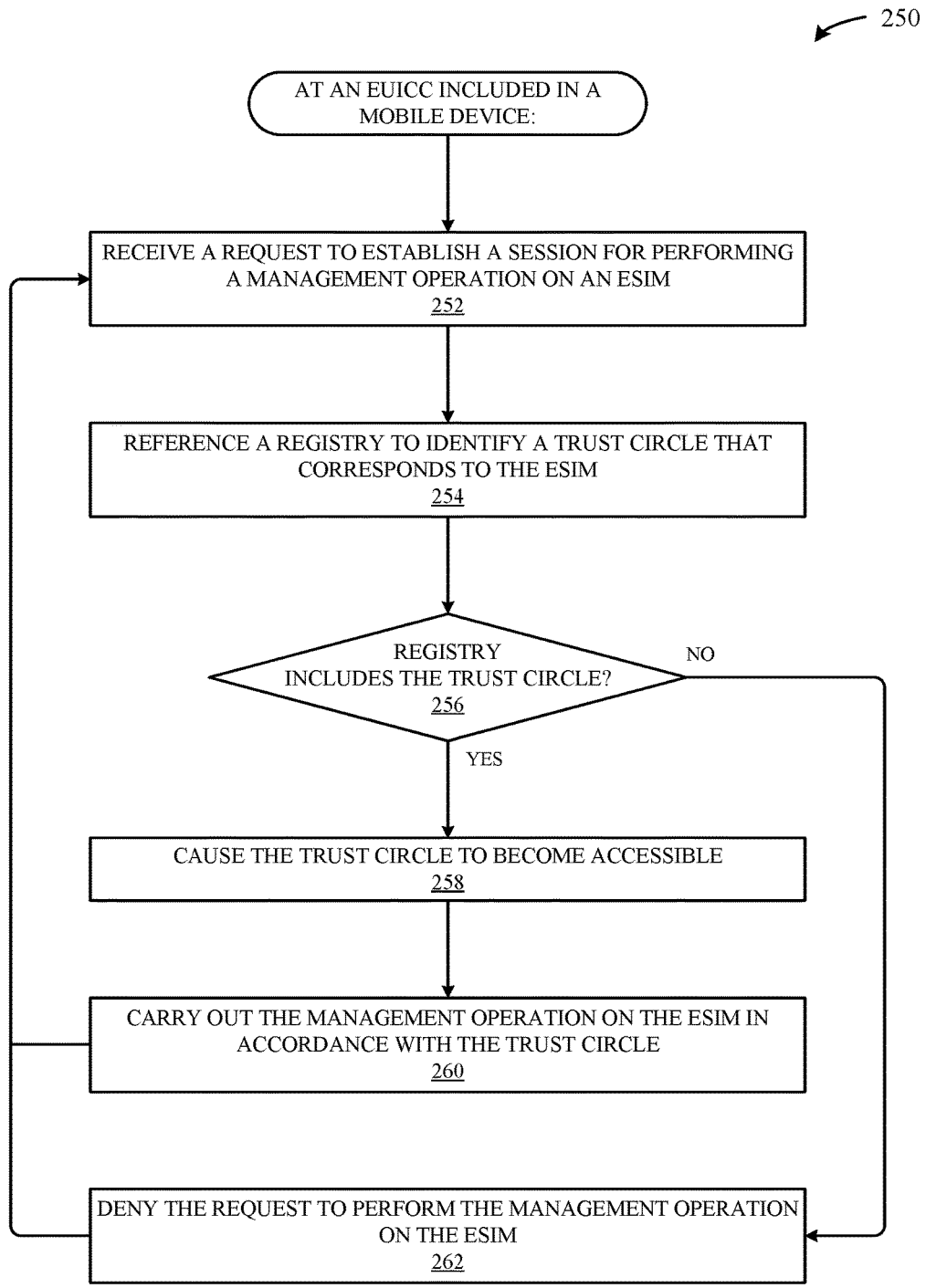
FIG. 2B illustrates a method for implementing a registry-based approach for activating different trust circles within an eUICC of the mobile device of FIG. 1, according to some embodiments.

FIG. 2B illustrates a method 250 for implementing a registry-based approach for activating different trust circles 222 within the eUICC 108, according to some embodiments. As shown in FIG. 2A, the method 250 begins at step 252, where the eUICC OS 214 receives a request to establish a session for performing a management operation on an eSIM 216. An example of a management operation can include an installation of the eSIM 216, an uninstallation of the eSIM 216, an activation of the eSIM 216, a deactivation of the eSIM 216, a swap of the eSIM 216 with another eSIM 216, and the like. At step 254, the eUICC OS 214 references the registry 226 to identify a trust circle 222 that corresponds to the eSIM 216.

At step 256, the eUICC OS 214 determines whether registry 226 includes the trust circle 222. If, at step 256, the eUICC OS 214 determines that registry includes the trust circle, then the method 250 proceeds to step 258. Otherwise, the method 250 proceeds to step 262, where the eUICC OS 214 denies the request to perform the management operation on the eSIM 216, as the trust circle 222 is not available (i.e., the eUICC 108 is not a member of the trust circle 222). At step 258, the eUICC OS 214 causes the trust circle to become accessible (e.g., in accordance with the techniques described above in conjunction with FIG. 2A). At step 260, the eUICC OS 214 performs the management operation on the eSIM 216 in accordance with the trust circle 222.

Figure 3A:
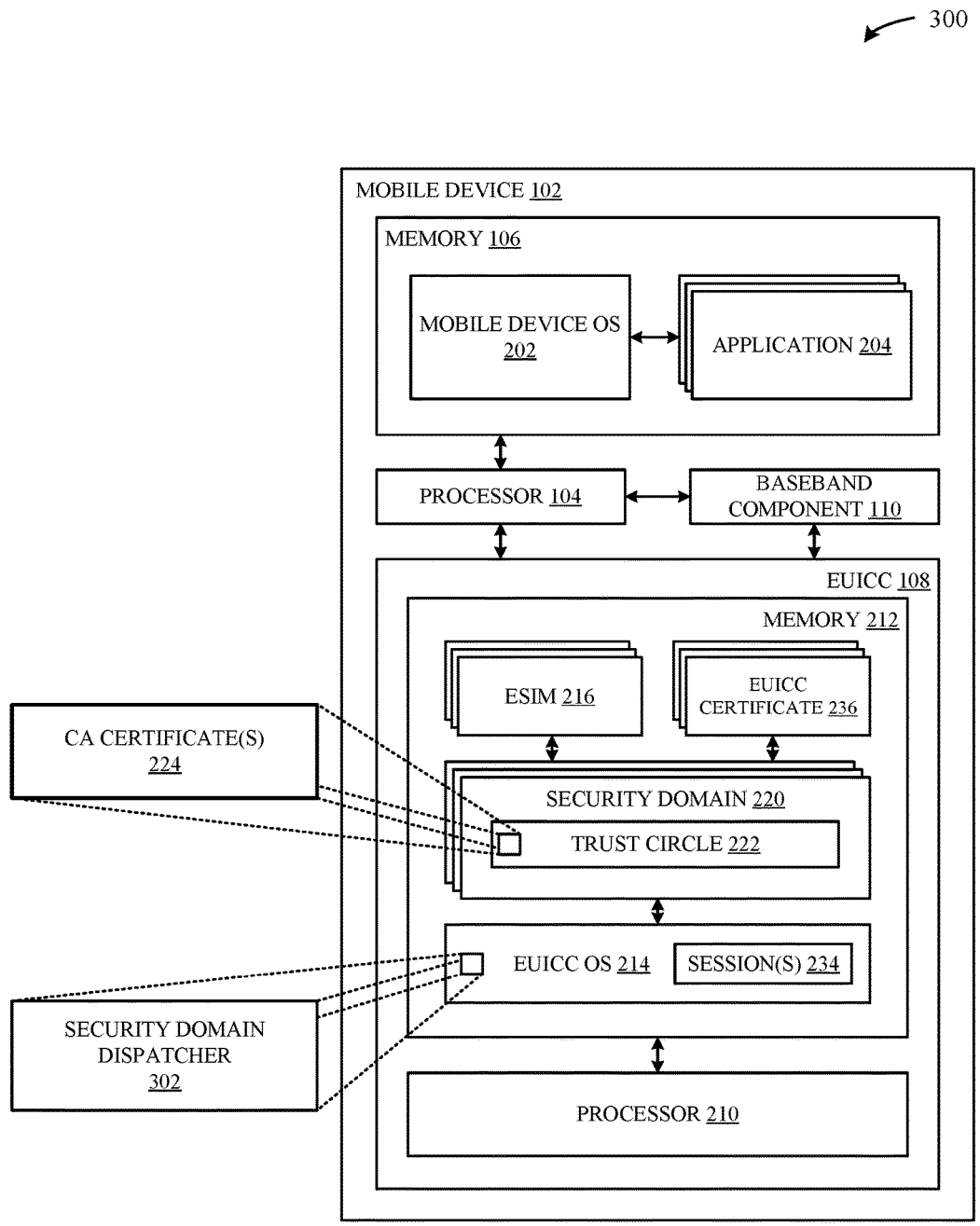
FIG. 3A illustrates an alternative, multiple security domain approach to the registry-based approach of FIGS. 2A-2B for implementing the various techniques described herein, according to some embodiments.

FIG. 3A illustrates an alternative approach to the registry-based approach of FIGS. 2A-2B for implementing the various techniques described herein, according to some embodiments. More specifically, instead of implementing a single security domain 220 (that includes multiple trust circles 222) within the eUICC 108, the eUICC 108 can be configured to implement multiple security domains 220. More specifically, and as shown in FIG. 3A, each security domain 220 includes a single trust circle 222, where the security domains 220 are managed by a security domain dispatcher 302. Notably, implementing multiple security domains 220 also contrasts the conventional approach of including a single security domain (e.g., as implemented by physical SIM cards). As with the registry-based approach, a trust circle 222 in FIG. 3A can also include one or more CA digital certificates 224, which represent digital certificates that are associated with the CAs 116 illustrated in FIG. 1.

As previously described herein, the registry-based approach described above in conjunction with FIGS. 2A-2B involves configuring the eUICC 108 to be a member of multiple trust circles 222, yet operate such that only a single trust circle 222 is activated within the eUICC 108 at a time. To provide a similar functionality—that is, to ensure that each eSIM 216 managed by the eUICC 108 is capable of accessing its corresponding trust circle 222, without exposing the eSIM 216 to any non-corresponding trust circles 222—the eUICC OS 214 can be configured to implement the security domain dispatcher 302. According to some embodiments, the security domain dispatcher 302 can be configured to properly route management operations in accordance with the different security domains 220 that are managed by the eUICC 108. More specifically, and according to some embodiments, the security domain dispatcher 302 can represent a component that functions as a communication interface between the eSIMs 216 and their corresponding security domains 220/trust circles 222. For example, when an authorized entity (e.g., an MNO 114) issues a request to perform an operation on an eSIM 216, the security domain dispatcher 302 can be configured to receive the request, and, in conjunction with the eUICC OS 214, forward the request to the corresponding security domain 220/trust circle 222. In this manner, the different trust circles 222 are not activated/deactivated (as with the registry-based approach) within the eUICC 108. Instead, each eSIM 216 is only able to access its respective trust circle 222 without having any visibility to the other security domains 220/trust circles 222.

It is noted that the separations/responsibilities of the various components of FIG. 3A are not limited to the illustrations of FIG. 3A or the exemplary embodiments described herein, and that these components can be combined/modified to provide the same functionality without departing from the scope of this disclosure.

Figure 3B:
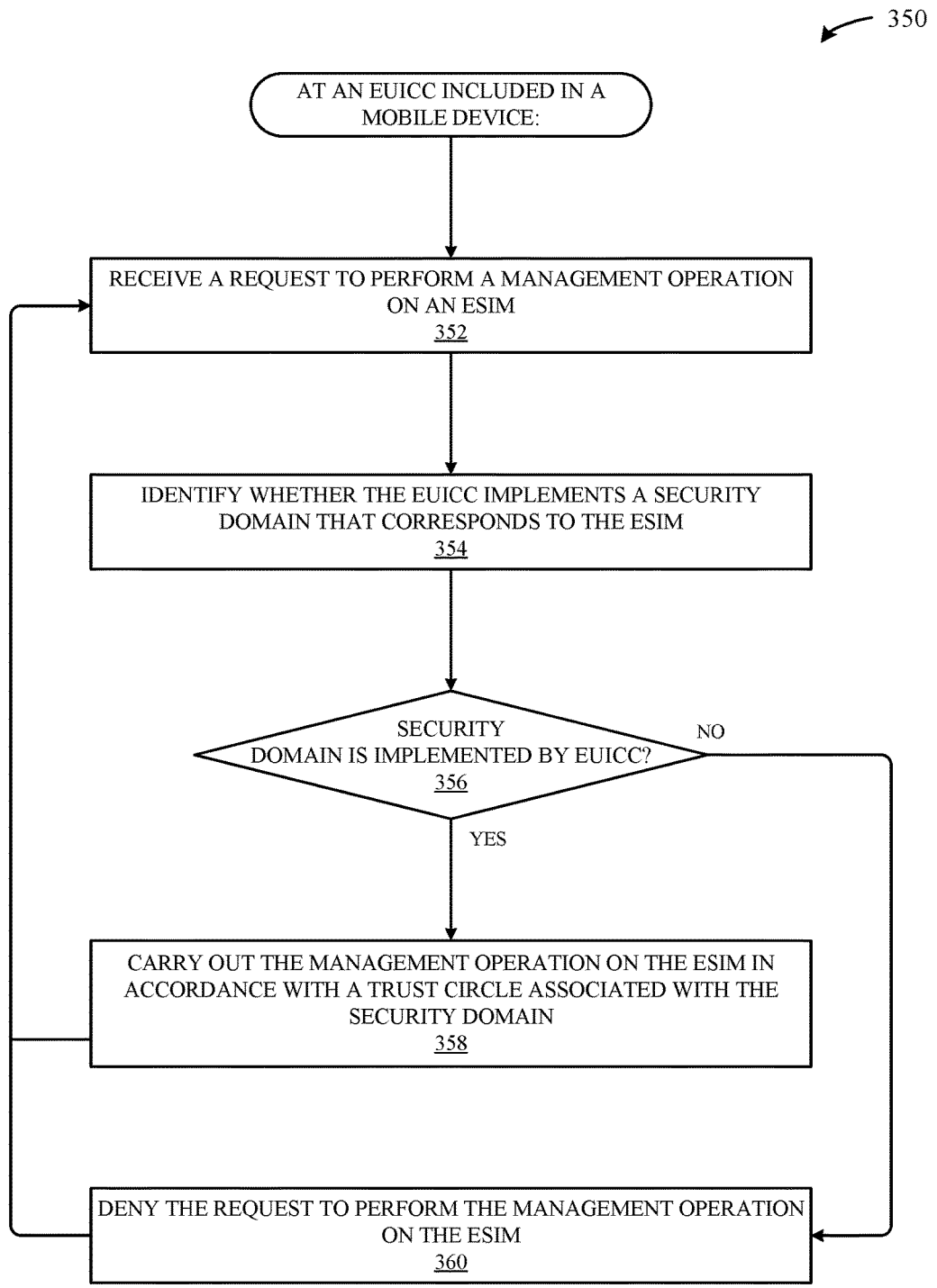
FIG. 3B illustrates a method for implementing a multiple security domain approach for accessing different trust circles within the eUICC of the mobile device of FIG. 1, according to some embodiments.

FIG. 3B illustrates a method 350 for implementing a multiple security domain approach for accessing different trust circles 222 within the eUICC 108, according to some embodiments. As shown, the method 350 begins at step 352, where the eUICC OS 214/the security domain dispatcher 302 receives a request to perform a management operation on an eSIM 216. An example of a management operation can include an installation of the eSIM 216, an uninstallation of the eSIM 216, an activation of the eSIM 216, a deactivation of the eSIM 216, a swap of the eSIM 216 with another eSIM 216, and the like.

At step 354, the eUICC OS 214/the security domain dispatcher 302 identifies whether the eUICC 108 implements a security domain 220 that corresponds to the eSIM 216. At step 356, the eUICC OS 214 determines whether security domain 220 is implemented by the eUICC 108. If, at step 356, the eUICC OS 214/the security domain dispatcher 302 determines that security domain 220 is implemented by the eUICC 108, then the method 350 proceeds to step 358. Otherwise, the method 350 proceeds to step 360, where the eUICC OS 214/the security domain dispatcher 302 denies the request to perform the management operation on the eSIM 216. At step 358, the eUICC OS 214/the security domain dispatcher 302 performs the management operation on the eSIM 216 in accordance with the trust circle 222 associated with the security domain 220.

Figure 4:
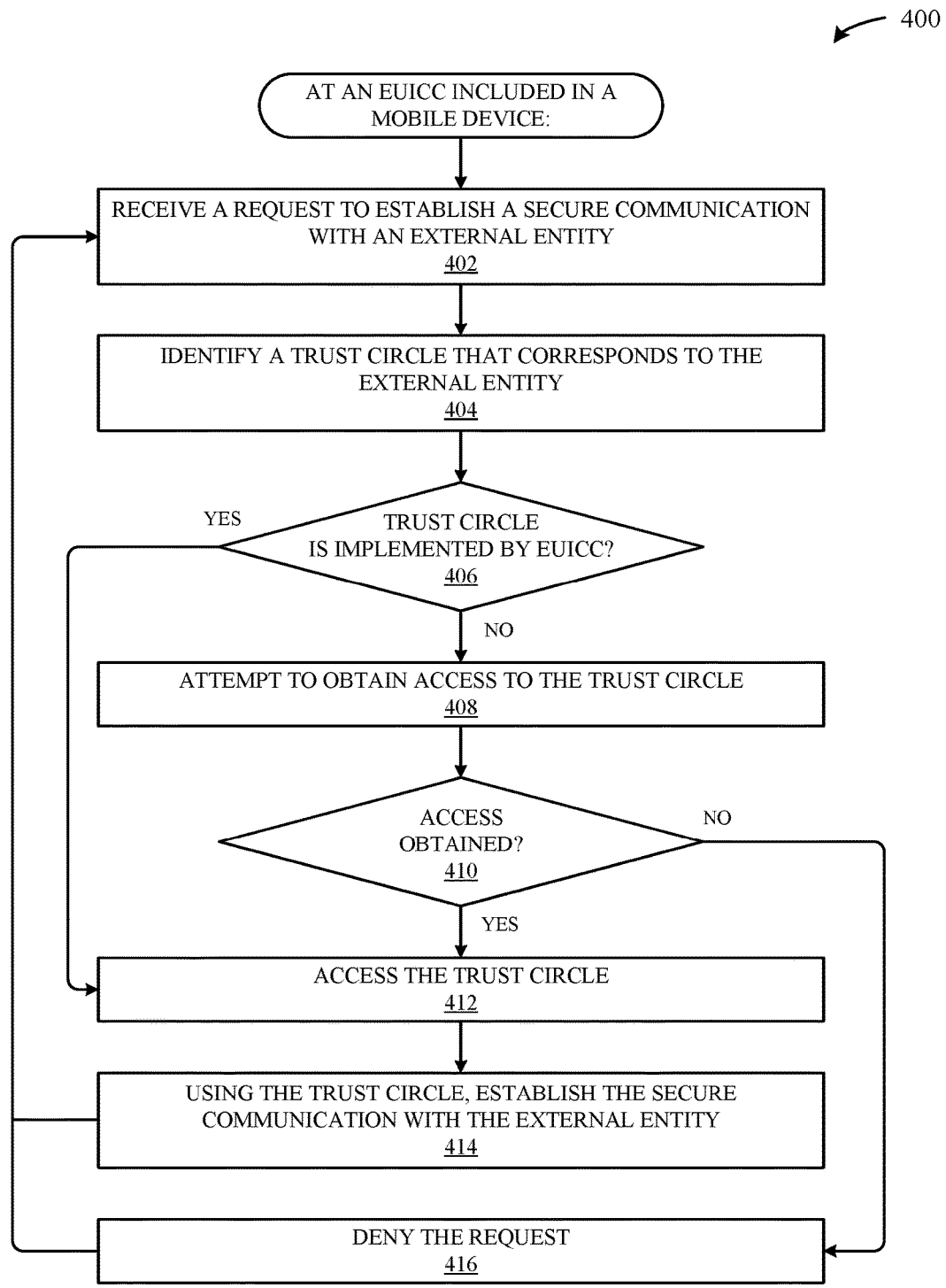
FIG. 4 illustrates a method for managing the eUICC-specific certificates within the eUICC of the mobile device of FIG. 1, according to some embodiments.

As previously set forth above, the eUICC 108 can be configured to manage its own eUICC certificates 236 that enable the eUICC 108 to establish secure connections with external entities. FIG. 4 illustrates a method 400 for managing the eUICC certificates 236, according to some embodiments. As shown in FIG. 4, the method 400 begins at step 402, where the eUICC OS 214 receives a request to establish a secure communication with an external entity (e.g., an MNO to which the eUICC 108/mobile device 102 is subscribed). At step 404, the eUICC OS 214 identifies a trust circle 222 (where the CA certificates 224 of a trust circle 222 can include the eUICC certificates 236) that corresponds to the external entity. At step 406, the eUICC OS 214 determines whether the trust circle 222 is implemented by eUICC 108. If, at step 406, the eUICC OS 214 determines that the trust circle 222 is implemented by eUICC 108, then the method 400 proceeds to step 412, which is described below in greater detail. Otherwise, the method 400 proceeds to step 408, where the eUICC OS 214 attempts to obtain access to the trust circle 222. This can involve, for example, downloading new eUICC certificates 236 of which the trust circle 222 is comprised and installing the new eUICC certificates 236 within the eUICC 108. At step 410, the eUICC OS 214 determines whether access is obtained (at step 408). If, at step 410, the eUICC OS 214 determines that access is obtained, then the method 400 proceeds to step 412. Otherwise, the method 400 proceeds to step 416, where the eUICC OS 214 denies the request. At step 412, the eUICC OS 214 accesses the trust circle 222. At step 414, the eUICC OS 214, using the trust circle 222, establishes the secure communication with the external entity.

In addition, it is noted that the various embodiments set forth herein can be used to support "global" eSIMs 216 that do not conform to or require specific trust circles 222 to operate. For example, a global eSIM 216 installed on the eUICC 108 may be indifferent to the trust circles 222 of which the eUICC 108 is member, thereby enabling various external entities to access the global eSIM 216 regardless of the trust circles 222 that are implemented within the eUICC 108.

Figure 5:
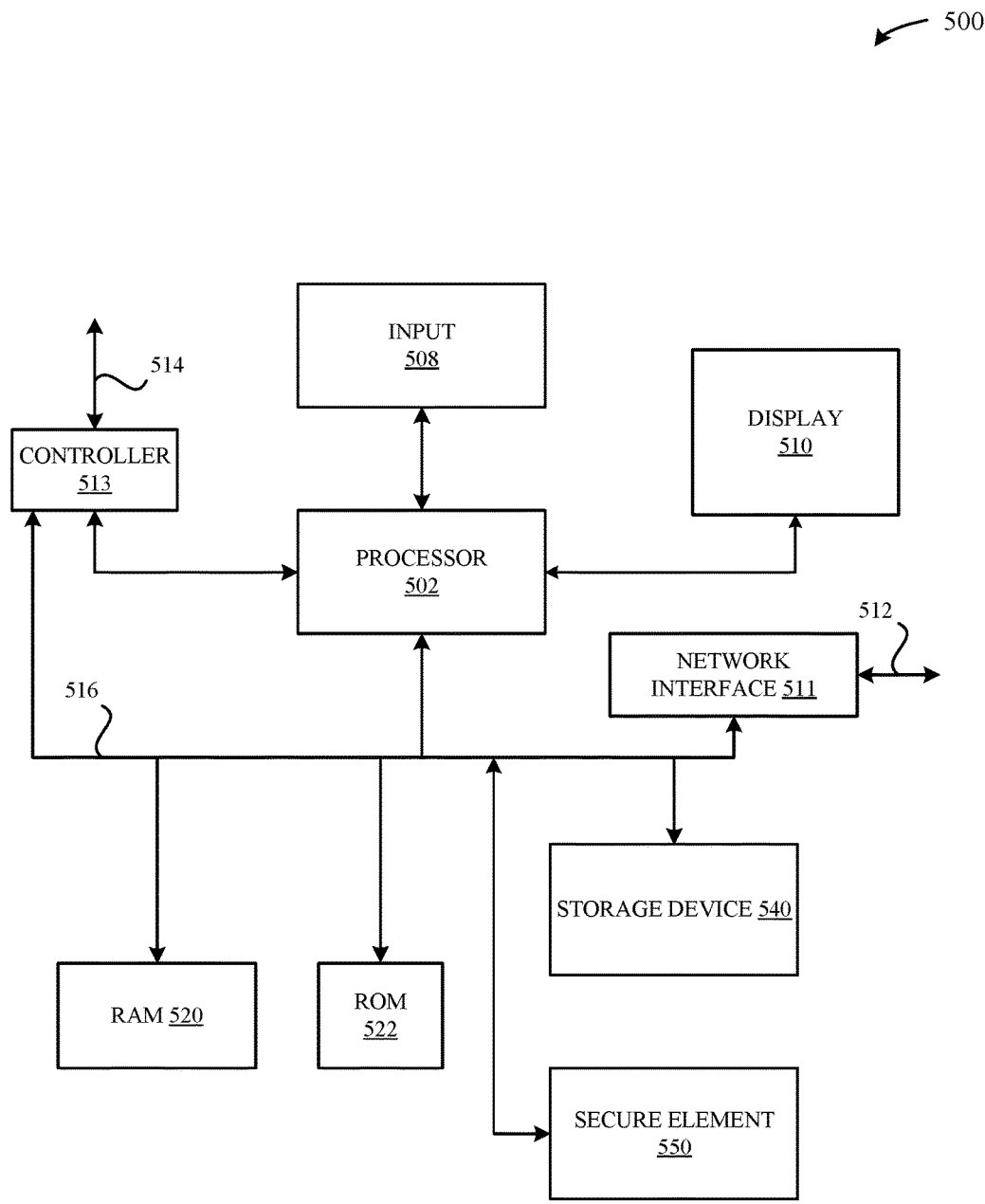
FIG. 5 illustrates a detailed view of a computing device that can be used to implement the various components described herein, according to some embodiments.

FIG. 5 illustrates a detailed view of a computing device 500 that can be used to implement the various components described herein, according to some embodiments. In particular, the detailed view illustrates various components that can be included in the mobile device 102 illustrated in FIG. 1. As shown in FIG. 5, the computing device 500 can include a processor 502 that represents a microprocessor or controller for controlling the overall operation of computing device 500. The computing device 500 can also include a user input device 508 that allows a user of the computing device 500 to interact with the computing device 500. For example, the user input device 508 can take a variety of forms, such as a button, keypad, dial, touch screen, audio input interface, visual/image capture input interface, input in the form of sensor data, etc. Still further, the computing device 500 can include a display 510 (screen display) that can be controlled by the processor 502 to display information to the user. A data bus 516 can facilitate data transfer between at least a storage device 540, the processor 502, and a controller 513. The controller 513 can be used to interface with and control different equipment through and equipment control bus 514. The computing device 500 can also include a network/bus interface 511 that couples to a data link 512. In the case of a wireless connection, the network/bus interface 511 can include a wireless transceiver.

The computing device 500 also include the storage device 540, which can represent a single storage device or multiple storage devices, and includes a storage management module that manages one or more partitions within the storage device 540. In some embodiments, storage device 540 can include solid state memory or the like. The computing device 500 can also include a Random Access Memory (RAM) 520 and a Read-Only Memory (ROM) 522. The ROM 522 can store programs, utilities or processes to be executed in a non-volatile manner. The RAM 520 can provide volatile data storage, and stores instructions related to the operation of the different software processes described herein. When the computing device 500 represents a mobile device 102, the computing device 500 can further include a secure element 550 that can represent the eUICC 108 illustrated in FIGS. 1-2 and described in detail herein.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for enabling a mobile device to manage a plurality of trust circles of which the mobile device is a member, the method comprising, at an embedded Universal Integrated Circuit Card (eUICC) included in the mobile device:

receiving a request to perform a management operation associated with an electronic Subscriber Identity Module (eSIM) managed by the eUICC;

accessing a registry managed by the eUICC to identify, among the plurality of trust circles, a particular trust circle that corresponds to the eSIM;

enabling access to the particular trust circle by providing read-access to a respective sandboxed container associated with the particular trust circle, wherein the respective sandboxed container stores at least one digital certificate that (i) corresponds to the trust circle, and (ii) is associated with a Certificate Authority (CA) that serves as a root of the trust circle;

disabling access to respective sandboxed containers associated with other trust circles of the plurality of trust circles that are distinct from the particular trust circle;

establishing a session that is specific to the management operation;

logically activating the particular trust circle within a scope of the session, wherein no other trust circle is logically activated within the scope of the session; and performing the management operation on the eSIM in accordance with the particular trust circle.

2. The method of claim 1, wherein the registry identifies, for each eSIM managed by the eUICC a corresponding trust circle.

3. The method of claim 1, wherein the request comprises a command to activate, modify, or disable the eSIM.

4. The method of claim 1, wherein the at least one digital certificate enables the mobile device participate as a member of the particular trust circle.

5. The method of claim 1, wherein logically activating the particular trust circle within the scope of the session enables the session to access the at least one digital certificate.

6. The method of claim 5, wherein the session is unable to access other digital certificates stored within the respective sandboxed containers associated with the other trust circles of the plurality of trust circles.

7. The method of claim 1, wherein the request is generated by a Mobile Network Operator (MNO) associated with the eSIM.

8. The method of claim 1, wherein the plurality of trust circles are managed by a security dispatcher implemented on the eUICC.

9. The method of claim 8, wherein the security dispatcher permits access to the particular trust circle by:
routing the request to the particular trust circle.

10. An embedded Universal Integrated Circuit Card (eUICC) configured to couple to an interface circuit in a wireless device, wherein the eUICC is configured to enable the wireless device to operate as a member of a plurality of trust circles by:
receiving a request to perform a management operation associated with an electronic Subscriber Identity Module (eSIM) managed by the eUICC;
accessing a registry managed by the eUICC to identify, among the plurality of trust circles, a particular trust circle that corresponds to the eSIM;
enabling access to the particular trust circle by providing read-access to a respective sandboxed container associated with the particular trust circle, wherein the respective sandboxed container stores at least one digital certificate that (i) corresponds to the trust circle, and (ii) is associated with a Certificate Authority (CA) that serves as a root of the trust circle;
disabling access to respective sandboxed containers associated with other trust circles of the plurality of trust circles that are distinct from the particular trust circle;
establishing a session that is specific to the management operation;
logically activating the particular trust circle within a scope of the session, wherein no other trust circle is logically activated within the scope of the session; and
performing the management operation on the eSIM in accordance with the particular trust circle.

11. The eUICC of claim 10, wherein the registry identifies, for each eSIM managed by the eUICC, a corresponding trust circle.

12. The eUICC of claim 11, wherein the request comprises a command to activate, modify, or disable the eSIM.

13. A wireless device configured to operate as a member of a plurality of trust circles, the wireless device comprising:
an interface circuit configured to communicate with another electronic device; and
an embedded Universal Integrated Circuit Card (eUICC) coupled to the interface circuit,
wherein the eUICC is configured to:
receive a request to perform a management operation associated with an electronic Subscriber Identity Module (eSIM) managed by the eUICC;
access a registry managed by the eUICC to identify, among the plurality of trust circles, a particular trust circle that corresponds to the eSIM;
enable access to the particular trust circle by providing read-access to a respective sandboxed container associated with the particular trust circle, wherein the respective sandboxed container stores at least one digital certificate that (i) corresponds to the trust circle, and (ii) is associated with a Certificate Authority (CA) that serves as a root of the trust circle;
disable access to respective sandboxed containers associated with other trust circles of the plurality of trust circles that are distinct from the particular trust circle;
establish a session that is specific to the management operation;
logically activate the particular trust circle within a scope of the session, wherein no other trust circle is logically activated within the scope of the session; and
perform the management operation on the eSIM in accordance with the particular trust circle.

14. The wireless device of claim 13, wherein the registry identifies, for each eSIM managed by the eUICC, a corresponding trust circle.

15. The wireless device of claim 13, wherein the request comprises a command to activate, modify, or disable the eSIM.

16. The wireless device of claim 13, wherein the at least one digital certificate enables the wireless device to participate as a member of the particular trust circle.

17. The wireless device of claim 13, wherein logically activating the particular trust circle within the scope of the session enables the session to access the at least one digital certificate.

18. The wireless device of claim 17, wherein the session is unable to access other digital certificates stored within the respective sandboxed containers associated with the other trust circles of the plurality of trust circles.

19. The wireless device of claim 13, wherein the plurality of trust circles are managed by a security dispatcher implemented on the eUICC.

20. The wireless device of claim 19, wherein the security dispatcher permits access to the particular trust circle by:
routing the request to the particular trust circle.

* * * * *